(12) United States Patent
Potier

(10) Patent No.: US 12,729,745 B2

(45) Date of Patent: Sep. 8, 2026

(54) STOP FOR A ROTARY ACTUATOR

(71) Applicant: Goodrich Actuation Systems SAS, Vernon (FR)

(72) Inventor: Karl Potier, Aix en Provence (FR)

(73) Assignee: Goodrich Actuation Systems SAS, Vernon (FR)

( * ) Notice: Subject to any disclaimer, the term of this patent is extended or adjusted under 35 U.S.C. 154(b) by 684 days.

(21) Appl. No.: 17/984,423

(22) Filed: Nov. 10, 2022

(65) Prior Publication Data

US 2023/0151874 A1 May 18, 2023

(30) Foreign Application Priority Data

Nov. 12, 2021 (EP) .................................... 21306579

(51) Int. Cl.

*B64C 9/02* (2006.01)
*B64C 13/50* (2006.01)
*F16F 7/02* (2006.01)
*F16F 15/129* (2006.01)
*F16H 19/08* (2006.01)
*G05G 5/04* (2006.01)

(52) U.S. Cl.

CPC ............ *F16F 15/129* (2013.01); *B64C 13/50* (2013.01); *F16H 19/08* (2013.01); *F16F 2222/04* (2013.01); *F16F 2232/02* (2013.01)

(58) Field of Classification Search

CPC ........ F16F 15/129; F16F 7/02; F16F 2222/04; F16F 2232/02; F16H 19/08; B64C 13/50; B64C 9/16; B64C 2009/005; B64C 9/02; B64C 9/323; G05G 5/04

See application file for complete search history.

(56) References Cited

U.S. PATENT DOCUMENTS

| | | | |
|---|---|---|---|
| 1,677,949 A | 7/1928 | Bond | |
| 4,493,245 A | 1/1985 | Kirsch et al. | |
| 4,595,158 A | 6/1986 | Robinson | |
| 4,641,737 A * | 2/1987 | Gillingham | F16H 25/2015 192/139 |

(Continued)

FOREIGN PATENT DOCUMENTS

| | | |
|---|---|---|
| GB | 365464 A | 1/1932 |

OTHER PUBLICATIONS

European Search Report for Application No. 21306579.0, mailed May 27, 2022, 7 pages.

*Primary Examiner* — Thomas W Irvin

(74) *Attorney, Agent, or Firm* — Kilpatrick Townsend & Stockton LLP

(57) ABSTRACT

A device for damping rotary motion of a component. The device comprises a first part adapted to be mounted to the component so as to rotate therewith, and a second part adapted to be fixed such that the first part moves towards the second part when the component rotates in a first direction (D1). At least one surface of the first part and a corresponding at least one surface of the second part are angled such that, as the first part moves towards the second part, the at least one surface of the first part will move into contact with and then move along the corresponding at least one surface of the second part such that friction between the at least one surface of the first part and the corresponding at least one surface of the second part acts against the movement of the first part.

13 Claims, 4 Drawing Sheets

(56) References Cited

U.S. PATENT DOCUMENTS

| | | | | |
|---|---|---|---|---|
| 4,865,269 | A * | 9/1989 | Metcalf | G05G 5/04 244/224 |
| 5,028,900 | A | 7/1991 | Dewitt | |
| 5,369,538 | A | 11/1994 | Moe et al. | |
| 9,072,836 | B2 * | 7/2015 | Plumptre | A61M 5/31555 |
| 11,685,517 | B2 * | 6/2023 | Galvão | B64C 17/02 244/201 |
| 11,746,862 | B2 * | 9/2023 | Sommerfeld | F16H 25/2015 74/89.37 |
| 11,794,802 | B1 * | 10/2023 | Tinnin | F16H 25/2015 |
| 11,827,338 | B2 * | 11/2023 | Davis | B64C 9/02 |
| 12,013,015 | B2 * | 6/2024 | Sommerfeld | F16H 25/2021 |
| 12,246,822 | B2 * | 3/2025 | Davis | B64C 3/18 |
| 2007/0108000 | A1 | 5/2007 | Derr et al. | |
| 2009/0275914 | A1 * | 11/2009 | Harms | A61M 5/31551 604/209 |
| 2013/0211343 | A1 * | 8/2013 | Plumptre | A61M 5/31555 74/89.37 |
| 2022/0205518 | A1 * | 6/2022 | Sommerfeld | F16H 25/2021 |
| 2023/0115404 | A1 * | 4/2023 | Gitnes | F16H 25/2015 74/89.37 |
| 2023/0332675 | A1 * | 10/2023 | Sommerfeld | F16H 25/2021 |

* cited by examiner 50
54
78
74
52
70
60
92
63
62
56
we
wn
wb
76
90
63
58
62
68

STOP FOR A ROTARY ACTUATOR

CROSS-REFERENCE TO RELATED APPLICATIONS

This application claims priority to European Patent Application No. 21306579.0 filed Nov. 12, 2021, the entire contents of which is incorporated herein by reference.

TECHNICAL FIELD

The present disclosure is concerned with a device for slowing and/or stopping rotary motion of a component such as, but not limited to, a rotary actuator. The rotary actuator could for example be a rotary actuator for driving a surface of an aircraft e.g. a flight control surface.

BACKGROUND

Actuators are used in aircraft to control various moveable components and surfaces including, but not only, flight control surfaces such as spoilers, ailerons and wing flaps.

Conventionally, hydraulic actuators have been used in aircraft, whereby a hydraulic piston, connected to the surface, is moved in response to the flow of hydraulic pressure from a hydraulic supply. Whilst hydraulic actuators have been used in aircraft for many years and have many advantages, such systems are fairly heavy and bulky. As the actuators are supplied from the aircraft supply, often a large plumbing network is required to deliver the pressure to distributed actuators, and the level of reliability is low. Local hydraulically powered actuators cannot easily be provided at aircraft wing ends etc. especially on so-called 'thin wing' aircraft. Further, hydraulic systems are prone to leakage and require seals and connectors, which all add to the size and weight of the system.

There is now a trend in the aircraft industry towards More Electric Aircraft (MEA) and, more recently, to All Electric Aircraft (AEA) with the objective being to replace hydraulic systems and parts with electrical systems and parts. Electric systems can be smaller and lighter and are generally 'cleaner' than hydraulic systems. This leads to the use of electromechanical actuators which may be fully rotary. There is therefore a need to provide an end stop device suitable for use with a rotary electromechanical actuator for primary flight controls in an aircraft.

SUMMARY

From a first aspect, the disclosure provides a device for slowing and/or stopping rotary motion of a component. The device includes a first part adapted to be mounted to the component so as to rotate therewith; and a second part adapted to be fixed such that the first part moves towards the second part when the component rotates in a first direction. The at least one surface of the first part and a corresponding at least one surface of the second part are angled such that, as the first part moves towards the second part, the at least one surface of the first part will move into contact with and then move along the corresponding at least one surface of the second part such that friction between the at least one surface of the first part and the corresponding at least one surface of the second part acts against the movement of the first part.

In a device according to any example of the disclosure, the first part may be symmetrical about an axis extending in the first direction and may comprise a body having a first angled surface formed on a first side thereof and a second angled surface formed on a second, opposite side thereof.

In a device according to any example of the disclosure, the second part may comprise first and second side portions extending in the first direction, wherein a respective angled surface is formed at a first end of each of the first and second side portions, wherein the respective angled surfaces of the first part and the second part are angled such that rotation of the component in the first direction will cause the angled surfaces of the first part to slide along the angled surfaces of the second part.

In a device according to any example of the disclosure, the second part may further comprise an end portion extending between the first and second side portions.

The end portion and the first and second side portions may form a U shape.

In a device according to any example of the disclosure, the first part may further comprise an end stop portion configured to move into contact with and be stopped by the second part after the at least one surface of the first part moves into contact with and then moves along the corresponding at least one surface of the second part.

In a device according to any example of the disclosure, the end stop portion may extend along the axis and may have an end configured to abut against the end portion to stop rotation of the first part relative to the second part.

A device according to any example of the disclosure may further comprise one or more support beams configured to absorb kinetic energy from the moving first part and to support the second part in a fixed position.

In a device according to any example of the disclosure, the at least one surface of the first part and the corresponding at least one surface of the second part may extend at an angle of between 300 and 600 to the direction of rotation.

From a further aspect, the disclosure provides an apparatus that includes a device as described in any previous example; a rotary component; and a fixed component. The rotary component is adapted to rotate relative to the fixed component. The first part of the device is fixed to the rotary component, and the second part of the device is fixed to the fixed component.

In an apparatus according to any example of the disclosure, the rotary component and the fixed component may be parts of a rotary actuator.

In an apparatus according to any example of the disclosure, the rotary actuator may be an electromechanical rotary actuator.

From a still further aspect, the disclosure may provide an aircraft control surface assembly comprising a flight control surface and an apparatus as in the above examples to move the flight control surface.

In any example of the disclosure, the flight control surface may be a spoiler.

BRIEF DESCRIPTION OF FIGURES

Examples of the invention will now be described, by way of example only, with reference to the drawings in which.

DETAILED DESCRIPTION

The present disclosure is directed towards a device for slowing and/or stopping rotary motion of a component. The device could be used in any number of examples such as, in rotary actuators for use in vehicles or machinery. Further, the device could potentially be used with many other components (other than actuators) which rotate relative to another structure.

Figure 1:
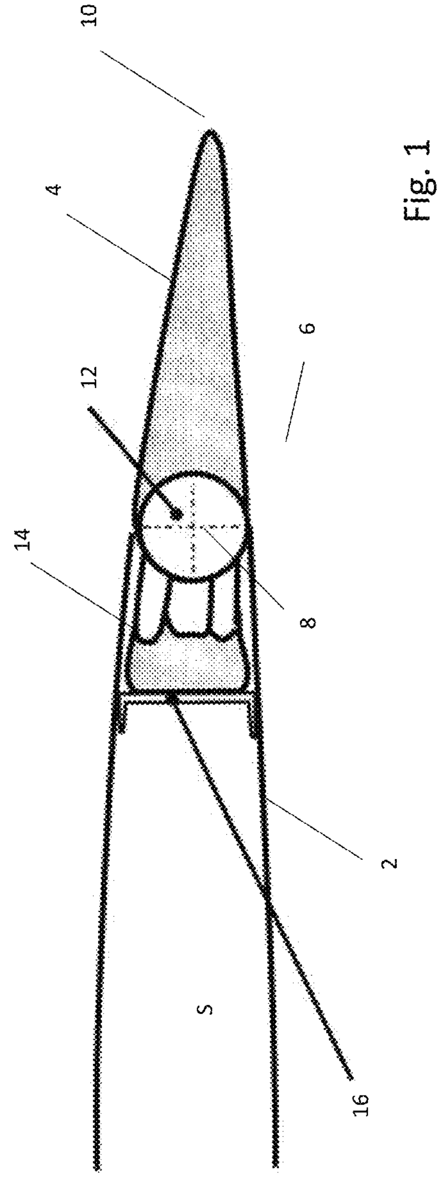
FIG. 1 is a schematic cross section view through part of an aircraft wing.

Referring to FIG. 1, this shows a possible example actuator for a control surface in a wing of an aircraft (not shown) with which the device according to the disclosure could be used. An aircraft wing 2 typically comprises a hollow section S and extends outwardly from a body (not shown) of the aircraft.

A number of control surfaces are typically provided on the wing 2. In the example shown, a control surface 4 is a spoiler provided adjacent an outer end 6 of the wing 2 (in other words, the end of the wing which is furthest from the aircraft body). The control surface 4 is configured to rotate about a hinge 8 in the wing 2 to move relative to the wing when actuated. The rotation of the control surface 4 is configured to alter the speed, altitude and/or direction of movement of the aircraft in flight or on the ground. In the example shown, the hinge 8 is located in the wing 2 and the control surface 4 extends outwardly from the hinge 8 and from the end of the wing to taper to a tip portion 10. It will be appreciated however that the control surface 4 may have any desired configuration and any desired location on an aircraft wing 2 depending on the design and intended use thereof.

A rotary actuator 12 is provided which is configured to move the control surface 4 to rotate about the hinge 8 in either a clockwise or anti-clockwise direction as required. Thus, the control surface 4 may be rotated to be in line with the wing 2 as shown in FIG. 1, to be angled such that the tip portion 10 extends above the wing 2 or to be angled such that the tip portion 10 extends below the wing 2. A control system (not shown) may be provided to control the rotary actuator 12.

As seen in FIG. 1, the rotary actuator 12 is sized so as to be housed within the hollow section of the wing 2 and or the control surface 4. In some examples, the rotary actuator is an electrical rotary actuator. The rotary actuator 12 is fixed relative to the wing 2 or the aircraft structure so as to provide a rotary drive output relative thereto. In the example shown, the rotary actuator 12 is mounted via a connection mechanism 14 (such as brackets for example) to the rear spar 16 of the wing 2. The rotary output of the rotary actuator 12 can be connected to a rod which is adapted to push against the control surface 4 or, as in the example of FIG. 1, the rotary output of the rotary actuator 12 can be directly connected to the control surface to rotate the control surface 4 about the hinge 8.

It will be appreciated that in many examples, including the example of FIG. 1, it is necessary to accurately control the movement of the rotary output of the rotary actuator 12 such that the movement thereof can be stopped accurately at the correct end position. In examples for use in controlling control surfaces, it will be appreciated that it is desirable for the control surface movements to be very accurately controlled. Especially when a high gear ratio is used within the rotary actuator, the inertia of the rotary output of the rotary actuator 12 may be significant and so a means of dissipating the kinetic energy of the rotary output of the rotary actuator to bring the actuator to a stop in a timely and accurate manner is required. This may be difficult to achieve, for example in aerospace applications where it is important to keep the weight of all components to a minimum and where there may be limited space available, for example in thin wing aircraft environments.

Figure 2:
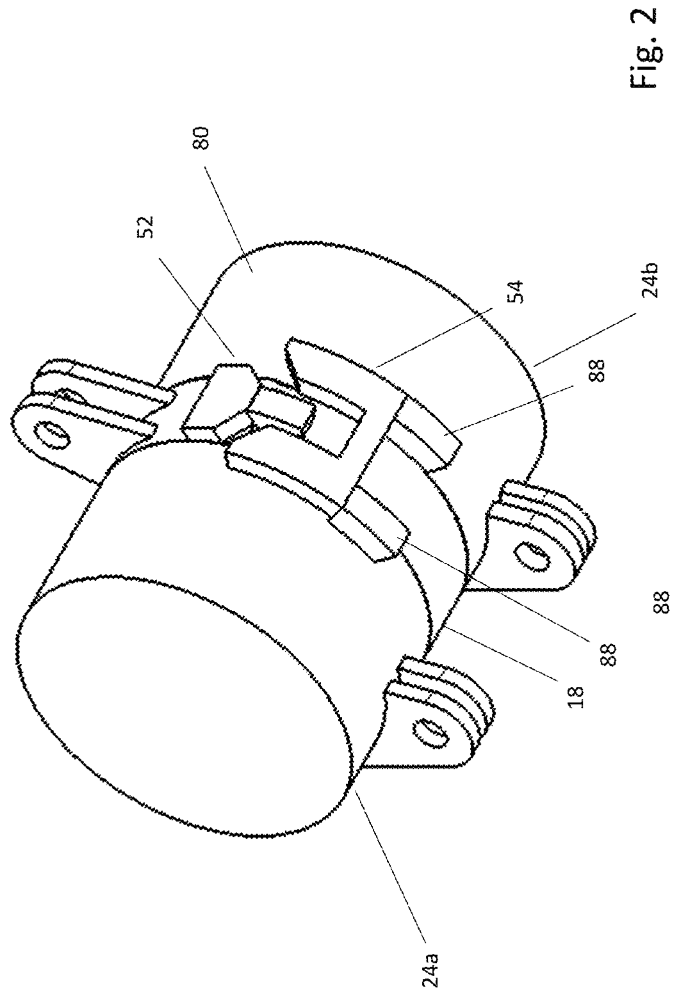
FIG. 2 is a perspective view of a rotary actuator according to an example of the disclosure.
Figure 4:
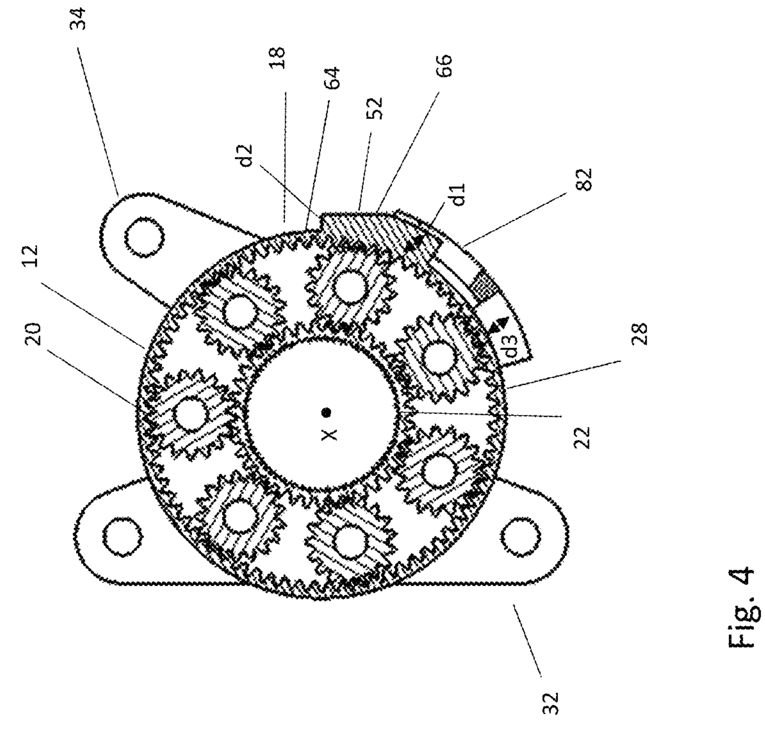
FIG. 4 is a section along line A-A of FIG. 3.
Figure 3:
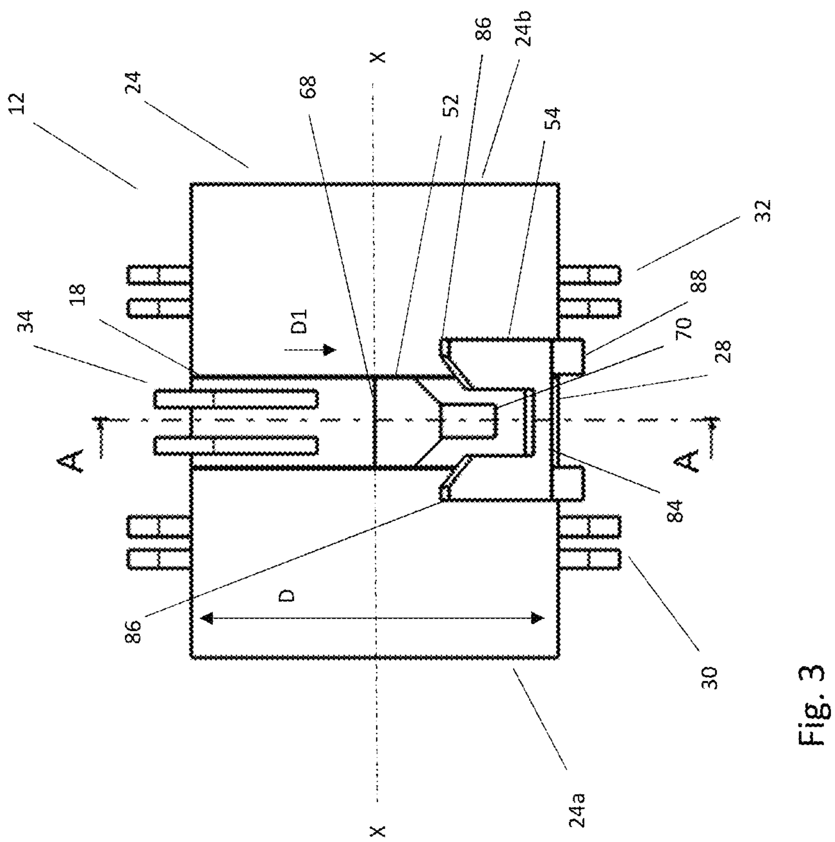
FIG. 3 is a side on view of the rotary actuator of FIG. 3.

Referring now to FIGS. 2 to 4, an exemplary rotary actuator including a device according to one example of the disclosure is shown. FIG. 3 is a side view of an electrical rotary actuator 12, for example for use with an aircraft control surface 4 as in the example of FIG. 1.

As seen in FIG. 3, in some examples the device according to the disclosure may be used with a rotary actuator such as an electrical rotary actuator. In some examples, the electrical rotary actuator may be for use in controlling a control surface 4 of an aircraft as described above. The rotary actuator 12 comprises a component 18 which is adapted to be driven to rotate about an axis X-X to form a hinge (thus forming a rotary output of the rotary actuator). The component 18 is annular in the example shown, the annular component 18 extending around and being centred on the axis X-X.

FIG. 4 is a vertical cross section through the rotary actuator of FIG. 3 taken along line A-A, i.e. through the component 18. As seen in FIG. 4, the component 18 is mounted via gears 20 to a rotary drive shaft 22 driven by an electric motor (not shown). The longitudinal axis of the rotary drive shaft 22 corresponds to the axis X-X about which the annular component 18 extends. The gears 20 may take any suitable form to provide the required torque to move the control surface 4. In one example, a planetary gear mechanism may be used.

The component 18 is adapted to rotate when driven by the drive shaft 22 and electric motor (not shown). A housing 24 may be provided for the component and may be fixed such that the component 18 rotates relative to the fixed housing 24 when driven by the motor. In the example shown, the housing 24 is cylindrical and is formed in two parts (first part 24*a* and second part 24*b*) which extend on either axial side of the annular component 18. The housing 24 and the annular component 18 are coaxial and have the same diameter (D) in the example shown such that the outer surface 26 of the housing 24 is approximately flush with the outer surface 28 of the annular component 18.

In the example shown, the housing 24 is mounted to a fixed structure, for example the rear spar 16 of an aircraft wing 2. In the example shown, one or more first brackets 30 are attached to the first part 24*a* for fixing the first part 24*a* of the housing 24 to a fixed structure and one or more second brackets 32 are attached to the second part 24*b* for fixing the second part 24*b* of the housing 24 to the fixed structure. Any suitable type of bracket may be provided and these may be integrally formed with the housing 24 or attached to the housing, for example by welding. The first and second brackets 30, 32 may be fixed to the fixed structure by any suitable means, for example by rivets or bolts extending through the brackets 30, 32 and the rear spar 16.

Thus, in use the rotary actuator of FIGS. 2 to 4 may be mounted to the rear spar 16 such that the housing 24 is fixed against rotation. When the rotary actuator is actuated, the component 18 will therefore be driven to rotate relative to the housing 24. In this example, a link 34 is fixed to the annular component 18 so as to rotate therewith and the link 34 is configured to drive movement of the control surface 4 as required when fixed to the control surface.

The component 18 of the rotary actuator will typically be configured to rotate through its stroke to a desired position relative to the housing 24. Thus, the component 18 may rotate between a first position (which is referred to here as 0°) at which the link 34 is in its resting position and a final maximum position at which the link 34 is rotated through a desired angle for a particular aircraft control surface. In one example, the component 18 may be configured to rotate through a maximum stroke of 300°. In another example the component 18 may be configured to rotate through a maximum stroke of 180° or less. In some examples, the component 18 may be configured to be able to rotate in either direction, so as to rotate away from the rest position at 0° in a clockwise or anti clockwise direction and then to rotate back to 0° in the other of the clockwise or anti clockwise directions as required.

To avoid potential damage to the control surface or other parts of the aircraft, it is desirable to be able to accurately stop the movement of the component 18 at the end of its stroke, for example at its final maximum position. To achieve this, a device according to the disclosure may be used. It will be appreciated however that such a device could be used in many other applications as will become more apparent from the following description.

Figure 5:
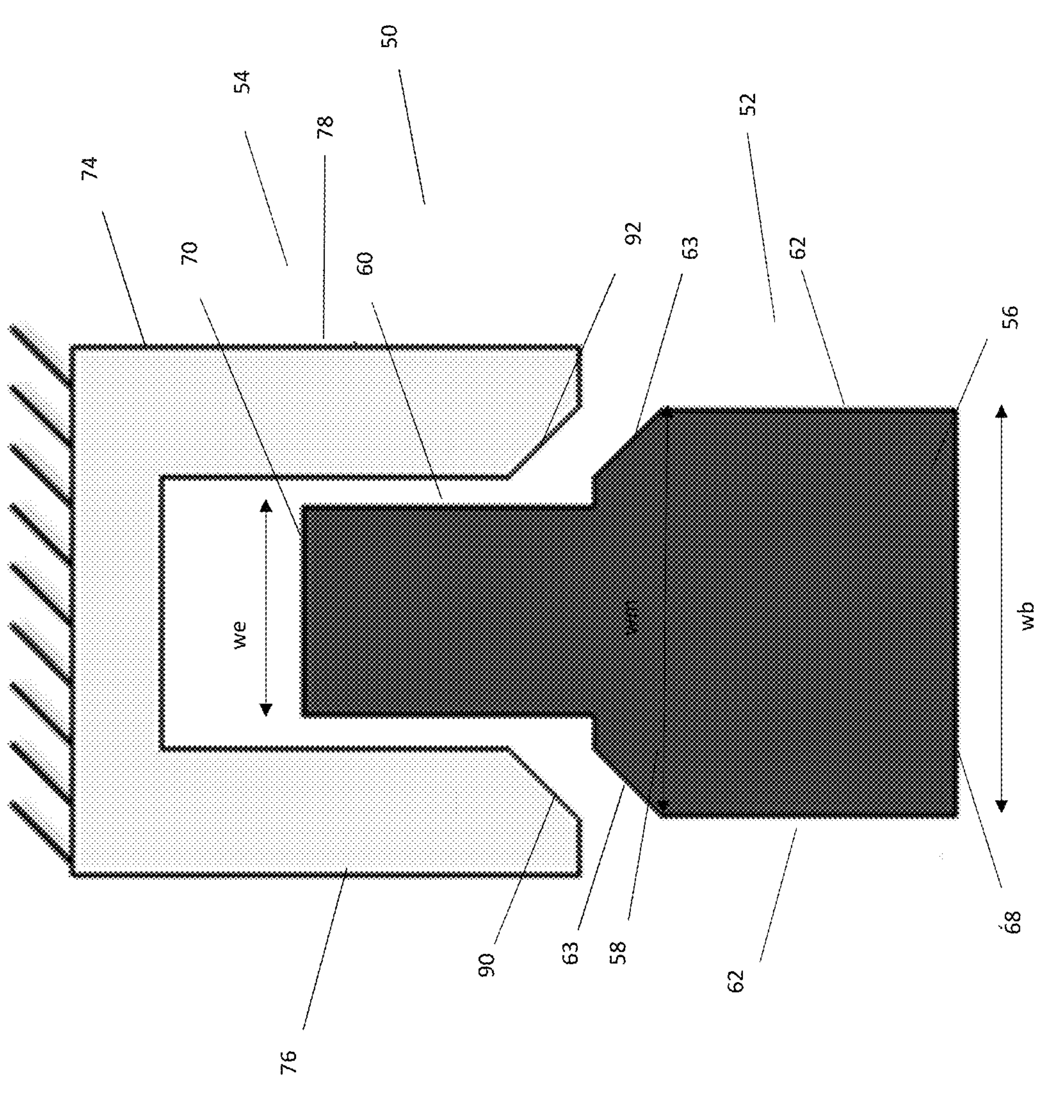
FIG. 5 is a schematic plan view of a device according to an example of the disclosure.

As seen for example in FIGS. 3, 4 and 5, the device 50 according to the disclosure comprises a first part 52 mounted to the component 18 to rotate therewith. In the example shown, the first part 52 is formed as an integral part of the component 18, that is the first part and the component 18 are machined or cast as a single structure. In other examples, the first part 52 can be a separate part which is fixed to the component 18 by brazing or welding for example.

The device 50 also comprises a second part 54 which is fixed such that the first part 52 moves towards the second part 54 when the component 18 rotates. In the example of FIG. 3, the second part 54 is fixed to the housing 24. It will be appreciated however that in other examples, the second part can be fixed against rotation in many other ways such as, for example, by fixing the second part to another fixed structure such as a fixed part of an aircraft structure.

The device 50 is configured such that the first part 52 and the second part 54 have a respective angled surface configured such that, as the first part 52 moves towards the second part 54 when the component 18 rotates, the surface of the first part 52 will move into contact with and then move along the corresponding surface of the second part 54 such that friction between the surface of the first part and the corresponding surface of the second part acts against the movement of the first part. Thus, the friction will act to slow and/or stop the rotation of the component 18.

In the example shown, the first part 52 comprises a body made up of a base portion 56 and a mid-portion 58. The first part 52 further comprises an end-stop portion 60. The base portion 56 is rectangular in plan view and has a first width wb. The mid-portion 58 is trapezoid in plan view and extends from the base portion 56. The mid-portion 56 has a width wm which is equal to the width wb of the base portion 56 at a first end thereof and is less than the width wb of the base portion 56 at a second opposite end thereof such that the first end of the mid-portion 56 is joined with the outer edges 62 of the base portion 56. The trapezoid mid-portion 56 therefore has angled side walls 63 which extend between the outer edges 62 of the base portion 56 and the end-stop portion 60. The end-stop portion 60 extends from the mid-portion 56, is rectangular in plan view and has a width we which is less than the width wm of the mid-portion where the mid-portion and the end-stop portion join.

In the example shown, the first part 52 extends radially outwardly from a radially outer surface 64 of the component 18 to an outer surface 66 of the first part 52, defining a depth of the first part 52. The first part 52 extends along a portion of the circumference of the component 18 from a first end 68 of the base portion 56 to a second end 70 of the end-stop portion 60. In one example, the first part 52 may be configured to extend over a portion of the circumference of the component 18, for example over between about one twentieth of the circumference of the component 18.

In the example shown, the first width wb of the base portion 56 corresponds to the width or the axial dimension of the component 18. Further, although the depth of the first part 52 could be constant, in the example shown, the depth of the first part has a first constant value d1 over the end-stop portion 60 and the mid-portion 56. The base portion 56 is then configured to taper from the mid-portion 56 to the first end 68 thereof such that the depth d2 of the base portion 56 at the first end 68 thereof is less than d1.

The second part 54 of the device 50 is configured to receive the first part 52 and, in the example shown, is made up of an end portion 74 and respective opposed side portions 76, 78 extending away from the end portion 74 so as to form a U-shape in plan view.

In the example shown, the second part 54 extends radially outwardly from the radially outer surface 80 of the first part **24*a* and the second part 24*b* such that the end portion 74 extends across the component 18 and the respective opposed side portions 76, 78 extend in the circumferential direction. The second part 54 extends radially outwardly to an outer surface 82 of the first part 54, defining a depth d3 of the second part 54. In the example shown, the depth d3 of the second part 54** is constant.

The second part 54 extends along a portion of the circumference of the housing 24 from a first end 84 of the end portion 74 to the opposite, free ends 86 of the respective opposed side portions 76. The second part 54 may further include support beams 88. The support beams may be joined to and extend beyond the first end 84 of the end portion 74 to extend away from the second part 54. In some examples, the support beams 88 may be joined to the housing 24 using screws or pins. The support beams 88 may act to absorb kinetic energy from the moving first part in use and to support the second part on the housing 24. In one example, the second part 54 may be configured to extend over about one sixth of the circumference of the housing 24.

As seen for example in FIG. 5, the axially inner corners of the free ends 86 of the respective opposed side portions 76, 78 are cut away to form angled surfaces 90, 92 extending inwardly towards the end portion 74. The second part is positioned on the housing 24 such that, as the component 18 is rotated in a first direction, the first part 52 will rotate towards the second part 54 such that the end-stop portion 60 of the first part 52 is at least partially received within the respective opposed side portions 76, 78 of the second part 54. As the component 18 continues to rotate in the first direction D1, the angled surfaces 90, 92 of the second part 54 will be brought into contact with the angled side walls 63 of the first part 52. The angled surfaces 90, 92 of the second part 54 and the angled side walls 63 of the first part 52 are angled such that further rotation of the component in the first direction will cause the angled side walls 63 to remain in engagement with and slide along the angled surfaces 90, 92. A resultant frictional force between the angled side walls 63 and the angled surfaces 90, 92 will act against the rotation of the component 18 (and the first part 52) in the first direction D1, thus acting to slow or damp the motion of the component 18 in the first direction D1.

In some examples, the resultant frictional force between the angled side walls 63 and the angled surfaces 90, 92 may be sufficient to damp or stop the motion of the component 18. However, the device 50 of the example shown further comprises an end stop to fully stop the movement of the component 18 relative to the housing 24 at a desired rotation. The end stop is provided by the second end 70 of the end-stop portion 60 of the first part 52 coming into contact with and abutting against the end portion 74 of the first part 54. In the example shown, the motion of the component 18 relative to the housing will have been slowed significantly due to friction before the end stop portion 60 comes into contact with the end portion 74, thus reducing the impact which the end portion 74 must be capable of withstanding. Further, the device 50 according to the disclosure is capable of stopping rotation of a component 18 such as the output of a rotary actuator in a very short time. In one example, the device can be used to stop a rotary actuator having an initial speed of 100°/s and an inertia of 5 kg·m2 in less than 10 ms and over a stroke of less than 1°.

It will be appreciated that the amount of slowing and/or stopping provided by the device 50 and the exact point of rotation at which the rotation of the component 18 is stopped may be varied by any of: varying the position of the first and or second parts 52, 54 relative to each other, by varying the dimensions of the end stop portion, by varying the angle at which the angled side walls 63 and/or the angled surfaces 90, 92 extend, by varying the materials and/or surface roughness of all or one or more parts of the first and second parts 54.

In one example of the disclosure, the angled side walls 63 may extend at an angle of between 20° and 70° to the circumferential direction, where the circumferential direction may correspond to the direction of rotation. In another example of the disclosure, the angled side walls 63 may extend at an angle of between 30° and 60° to the circumferential direction. In a still further example of the disclosure, the angled side walls 63 may extend at an angle of between 40° and 50° to the circumferential direction, for example at about 45° to the circumferential direction. It will be understood that the angled surfaces 90, 92 at least approximately mirror the angled side walls 63 to allow the angled side walls 63 to move across the angled surfaces 90, 92 as the first part 52 moves towards the second part 54.

The first and second parts 52, 54 of the device 50 could be made of any suitable materials. In some examples, for example for use in aerospace applications, the first and second parts are both made of steel.

It will be appreciated by those skilled in the art that the disclosure has been illustrated by describing one or more examples thereof, but is not limited to these examples; many variations and modifications are possible, within the scope of the accompanying claims. In some examples therefore, a first device may be provided for slowing or stopping rotation of a component at the end of its stroke in a first direction and a second device may be provided for slowing or stopping rotation of the component at the end of its stroke in a second, opposite direction. Further, although the device shown in FIGS. 2 to 5 comprises a U-shaped part having an angled surface on either side thereof, it will be understood that in some examples, only one single angled surface could be provided on the first part to interact with and slide along a single angled surface provided on the second part.

The invention claimed is:

1. An apparatus for slowing and/or stopping rotary motion of a component, the apparatus comprising:

a rotary component and a fixed component, wherein the rotary component is adapted to rotate relative to the fixed component, and wherein the rotary component and the fixed component are parts of an electromechanical rotary actuator;

a first part fixed to the rotary component so as to rotate therewith; and a second part fixed to the fixed component such that the first part moves towards the second part when the rotary component rotates in a first direction, wherein at least one surface of the first part and a corresponding at least one surface of the second part are angled such that, as the first part moves towards the second part, the at least one surface of the first part will move into contact with and then move along the corresponding at least one surface of the second part such that friction between the at least one surface of the first part and the corresponding at least one surface of the second part acts against the movement of the first part.

2. An apparatus as claimed in claim 1, wherein the first part is symmetrical about an axis extending in the first direction and comprises a body having a first angled surface formed on a first side thereof and a second angled surface formed on a second, opposite side thereof.

3. An apparatus as claimed in claim 2, wherein the second part comprises first and second side portions extending in the first direction, wherein a respective angled surface is formed at a first end of each of the first and second side portions, wherein the respective angled surfaces of the first part and the second part are angled such that continued rotation of the rotary component in the first direction will cause the angled surfaces of the first part to slide along the angled surfaces of the second part.

4. An apparatus as claimed in claim 3, wherein the second part further comprises an end portion extending between the first and second side portions.

5. An apparatus as claimed in claim 4, wherein the end portion and the first and second side portions form a U shape.

6. An apparatus as claimed in claim 5, wherein the first part further comprises an end stop portion configured to move into contact with and be stopped by the second part after the at least one surface of the first part moves into contact with and then moves along the corresponding at least one surface of the second part.

7. An apparatus as claimed in claim 6, wherein the end stop portion extends along the axis and has an end configured to abut against the end portion to stop rotation of the first part relative to the second part.

8. An apparatus as claimed in claim 4, wherein the first part further comprises an end stop portion configured to move into contact with and be stopped by the second part after the at least one surface of the first part moves into contact with and then moves along the corresponding at least one surface of the second part.

9. An apparatus as claimed in claim 8, wherein the end stop portion extends along the axis and has an end configured to abut against the end portion to stop rotation of the first part relative to the second part.

10. An apparatus as claimed in claim 1, further:

one or more support beams configured to absorb kinetic energy from the moving first part and to support the second part in a fixed position.

11. An apparatus as claimed in claim 1, wherein the at least one surface of the first part and the corresponding at least one surface of the second part extend at an angle of between 30° and 60° to direction of rotation.

12. An aircraft control surface assembly comprising:

a flight control surface; and an apparatus as claimed in claim 1 to move the flight control surface.

13. An aircraft control surface assembly as claimed in claim 12, wherein the flight control surface is a spoiler.

* * * * *